US012661999B2

(12) United States Patent
Berg et al.

(10) Patent No.: US 12,661,999 B2
(45) Date of Patent: Jun. 23, 2026

(54) COMPUTER SYSTEM AND METHOD FOR CONTROLLING TORQUE PROVIDED BY A MOTOR

(71) Applicant: VOLVO TRUCK CORPORATION, Gothenburg (SE)

(72) Inventors: Jan Berg, Curitiba-Pr (BR); Guilherme Balvedi, Curitiba Parana (BR); Iron Tessaro, Curitiba Paraná (BR)

(73) Assignee: VOLVO TRUCK CORPORATION, Gothenburg (SE)

( * ) Notice: Subject to any disclaimer, the term of this patent is extended or adjusted under 35 U.S.C. 154(b) by 70 days.

(21) Appl. No.: 18/637,005

(22) Filed: Apr. 16, 2024

(65) Prior Publication Data

US 2024/0343124 A1     Oct. 17, 2024

(30) Foreign Application Priority Data

Apr. 17, 2023     (EP) ..................................... 23168345

(51) Int. Cl.
*B60L 15/20*          (2006.01)

(52) U.S. Cl.
CPC .......... *B60L 15/20* (2013.01); *B60L 2240/12* (2013.01); *B60L 2240/14* (2013.01); *B60L 2240/26* (2013.01); *B60L 2240/486* (2013.01); *B60L 2240/642* (2013.01); *B60L 2250/26* (2013.01)

(58) Field of Classification Search
CPC .. B60L 15/20; B60L 2240/12; B60L 2240/14; B60L 2240/26; B60L 2240/486; B60L 2240/642; B60L 2250/26; F16H 61/0213; F16H 59/44; F16H 59/48; F16H 59/52; F16H 59/70; F16H 2059/147; F16H 2059/148; F16H 2059/663; F16H 2061/022; F16H 2063/504; B60Y 2200/14

See application file for complete search history.

(56) References Cited

U.S. PATENT DOCUMENTS

| | | | |
|---|---|---|---|
| 5,243,523 A | 9/1993 | Stepper et al. | |
| 6,220,223 B1 | 4/2001 | Weisman et al. | |
| 2012/0029776 A1* | 2/2012 | Staudinger .............. | F16H 61/68 701/55 |

(Continued)

FOREIGN PATENT DOCUMENTS

| | | | | |
|---|---|---|---|---|
| CN | 113771642 A | * 12/2021 | .............. | B60L 15/20 |
| CN | 113983155 A | 1/2022 | | |

(Continued)

OTHER PUBLICATIONS

English translation of Wu et al. (CN 113771642) (Year: 2021).*
Extended European Search Report in corresponding European Application No. 23168345.9 dated Sep. 21, 2023 (9 pages).

*Primary Examiner* — Kyle J Kingsland
(74) *Attorney, Agent, or Firm* — Jeffri A. Kaminski; Venable LLP

(57) ABSTRACT

A computer system includes processing circuitry for controlling a torque provided by a motor of a powertrain system of a vehicle. The powertrain system is configured to provide a physical total gear ratio, wherein the processing circuitry is configured to determine a virtual total gear ratio for the powertrain system based on one or more operational parameters of the vehicle, and cause control of the torque provided by the motor based on the virtual total gear ratio.

19 Claims, 6 Drawing Sheets

(56)                    References Cited

U.S. PATENT DOCUMENTS

2016/0001769 A1 *    1/2016  Kamioka  ............... B60W 20/11
                                                            180/65.265
2021/0387530 A1 *   12/2021  Oh  ...................... F16H 61/0213
2022/0063624 A1 *    3/2022  Takenaka  ............. E02F 9/2079

FOREIGN PATENT DOCUMENTS

DE        102009002387  A1    10/2010
EP            3892506  A1    10/2021
WO         2021077182  A1     4/2021

* cited by examiner

|  | Vehicle acceleration [m/s²] | | | | | |
|---|---|---|---|---|---|---|
|  | -1 | 0 | 0.25 | 0.5 | 0.75 | 1 |
| 0 | 3.09 | 3.09 | 2.85 | 2.64 | 2.45 | 2.45 |
| 20 | 3.09 | 3.09 | 2.85 | 2.64 | 2.45 | 2.45 |
| 40 | 3.09 | 3.09 | 2.85 | 2.64 | 2.45 | 2.45 |
| 60 | 3.09 | 3.09 | 2.84 | 2.64 | 2.45 | 2.45 |
| 80 | 3.09 | 2.85 | 2.64 | 2.64 | 2.45 | 2.45 |
| 100 | 3.09 | 2.64 | 2.45 | 2.45 | 2.45 | 2.45 |
Vehicle speed [km/h]
FIG. 4
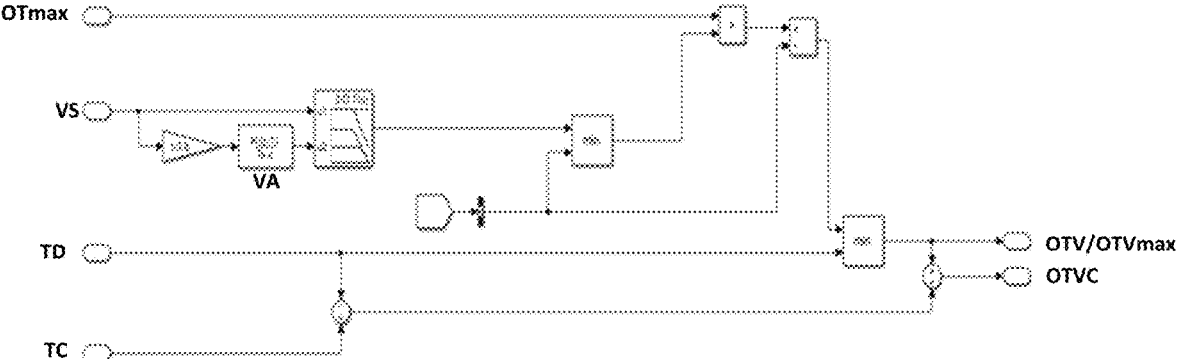
FIG. 5
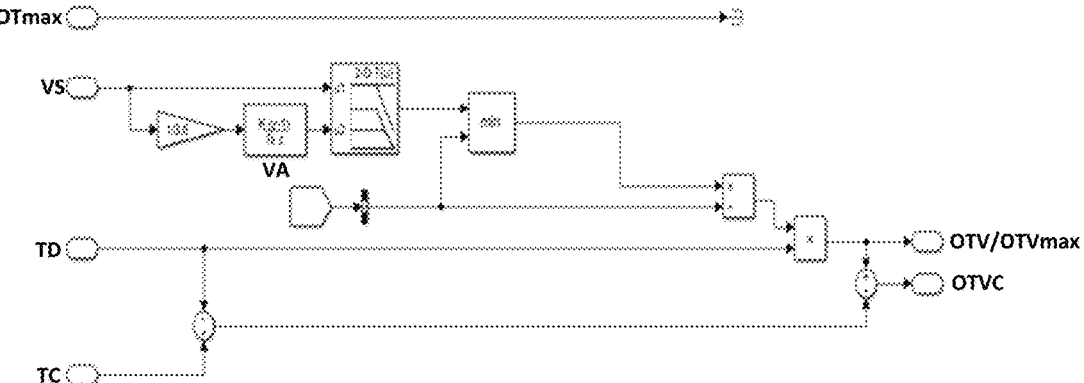
FIG. 6

COMPUTER SYSTEM AND METHOD FOR CONTROLLING TORQUE PROVIDED BY A MOTOR

TECHNICAL FIELD

The disclosure relates generally to a system and method for controlling a motor. In particular aspects, the disclosure relates to a computer system and method for controlling torque provided by a motor. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In conventional vehicles propeller power is generated by a motor, for example in the form of an internal combustion engine, and is transmitted to the wheels of the vehicle. The power is transmitted to wheels through the powertrain. The powertrain may include said motor as well as a clutch, gearbox and differential gearing. The entire powertrain has a final gear ratio which may be increased and decreased depending on the selected gear in the gearbox.

Particularly for heavy-duty vehicles, the final gear ratio is of great importance for the operation of the vehicle. Heavy-duty vehicles can be specified with several different final gear ratios depending on their final application. Fast ratios are commonly applied to long haul applications on flat roads, while slower ratios to vehicles operating in tough conditions, such as high gross combination weight (GCW) and hilly terrains. However, there are vehicles operating in both tough and less demanding conditions. For example, the vehicles can run empty or loaded and on flat, hilly, or mixed routes. In those cases, the vehicle cannot be fully optimized to be fuel efficient in all conditions due to its fixed final gear ratio.

Based on the above, there is a need for improvements.

SUMMARY

According to a first aspect of the disclosure, a computer system comprising processing circuitry for controlling a torque provided by a motor of a powertrain system of a vehicle is provided. The powertrain is configured to provide a physical total gear ratio. The processing circuitry is configured to determine a virtual total gear ratio for the powertrain system based on one or more operational parameters of the vehicle, and cause control of the torque provided by the motor based on the virtual total gear ratio. The first aspect of the disclosure may seek to increase the fuel efficiency of the vehicle. A technical benefit may include that the virtual total gear ratio allows for a torque management strategy where the motor software simulates a gear ratio based on operational parameters of the vehicle in order to optimize the torque provided by the motor for fuel efficiency.

Optionally in some examples, including in at least one preferred example, the processing circuitry may be configured to cause control of the torque provided by the motor based on the virtual gear ratio by causing control of said motor. A technical benefit may include that the fuel efficiency may be improved in a non-intrusive manner.

Optionally in some examples, including in at least one preferred example, the one or more operational parameters of the vehicle may comprise at least one of vehicle speed data, vehicle acceleration data, vehicle weight data, road inclination data, the physical total gear ratio and topography data. A technical benefit may include that the torque provided by the motor may be controlled based on the present or predicted conditions to improve the fuel efficiency of the vehicle.

Optionally in some examples, including in at least one preferred example, the virtual total gear ratio may be determined based on the vehicle acceleration data and the vehicle speed data. A technical benefit may include that the torque based on a virtual total gear ratio is optimized for a particular speed and acceleration instead of being a fixed physical gear ratio, thereby improving the fuel efficiency of the vehicle.

Optionally in some examples, the virtual total gear ratio may be determined by mapping of the vehicle speed data and the vehicle acceleration data to a reference virtual total gear ratio. A technical benefit may include that the mapping of different levels of vehicle speed and vehicle acceleration allows for independent adjustment of the balance between the fuel efficiency and drivability depending on the vehicle's usage.

Optionally in some examples, the virtual total gear ratio is determined for an upcoming road segment ahead of the vehicle and based on topography data and/or road inclination data for said upcoming road segment. A technical benefit may include that the torque provided by the engine may be adjusted in advance prior to a certain road topography occurring further improving the fuel efficiency of the vehicle.

Optionally in some examples, the processing circuitry may be further configured to determine a torque value based on the virtual total gear ratio and cause control of the torque provided by the motor based on the torque value.

Optionally in some examples, the processing circuitry may be further configured to determine an output torque of the motor based on the torque value.

Optionally in some examples, the processing circuitry may be further configured to determine an output torque max value for the motor based on the torque value. A technical benefit may include that a max torque level may be set for the motor, thereby limiting the motor torque to a suitable level for keeping the drivability to an acceptable level while improving fuel efficiency.

Optionally in some examples, the processing circuitry may be further configured to obtain motor torque demand data associated with a torque demand for the motor and/or a current pedal demand and determine the torque value based on the motor torque demand data. A technical benefit may include that the virtual total gear ratio is adapted based on the present or predicted demand of the torque provided by the motor increasing the responsiveness of the torque management strategy.

Optionally in some examples, the virtual total gear ratio may be determined for an operational state of the vehicle. A technical benefit may include that the responsiveness of the torque management strategy is improved due to the torque being controlled in accordance with a present or predicted operational state.

Optionally in some examples, the physical total gear ratio for the powertrain system may be associated with the operational state of the vehicle.

Optionally in some examples, the operational state of the vehicle may be any one of a drive mode, a cruise control mode, a pedal driving mode, an automatic gearbox mode, a manual gearbox mode and a kickdown mode.

According to a second aspect of the disclosure, a vehicle is provided. The vehicle comprises the computer system.

The second aspect of the disclosure may seek to achieve a more fuel efficient vehicle. A technical benefit may include that the virtual total gear ratio allows for a torque management strategy where the motor software simulates a gear ratio based on operational parameters of the vehicle in order to optimize the motor torque for fuel efficiency.

Optionally in some examples, the vehicle comprises a powertrain system comprising a motor.

According to a third aspect of the disclosure, a method for controlling the torque provided a motor of a powertrain system of a vehicle is provided. The powertrain system is configured to provide a physical total gear ratio. The method comprises determining, by a processing circuitry of a computer system, a virtual total gear ratio for the powertrain system based on one or more operational parameters of the vehicle, and causing control of the torque provided by motor based on the virtual total gear ratio, by the processing circuitry. The third aspect of the disclosure may seek to achieve a more fuel efficient manner of controlling a motor of the vehicle. A technical benefit may include that the virtual total gear ratio allows for a torque management strategy where the motor software simulates a gear ratio based on operational parameters of the vehicle in order to optimize the torque provided by the motor for fuel efficiency.

Optionally in some examples, the method may further comprise causing, by the processing circuitry, control of the torque provided by the motor based on the virtual gear ratio by causing control of said motor. A technical benefit may include that the fuel efficiency may be improved in a non-intrusive manner.

Optionally in some examples, the one or more operational parameters of the vehicle may comprise at least one of vehicle speed data, vehicle acceleration data, vehicle weight data, road inclination data, the physical total gear ratio and topography data. A technical benefit may include that the torque provided by the motor may be controlled based on the present or predicted conditions to improve the fuel efficiency of the vehicle.

Optionally in some examples, the method may further comprise determining the virtual total gear ratio based on the vehicle acceleration data and vehicle speed data. A technical benefit may include that the torque based on a virtual total gear ratio is optimized for a particular speed and acceleration instead of being a fixed physical gear ratio, thereby improving the fuel efficiency of the vehicle.

Optionally in some examples, the method may further comprise determining the virtual total gear ratio by mapping of the vehicle speed data and the vehicle acceleration data to a reference virtual total gear ratio.

Optionally in some examples, the method may further comprise determining the virtual total gear ratio for an upcoming road segment ahead of the vehicle based on topography and/or road inclination data for said upcoming road segment. A technical benefit may include that the torque provided by the engine may be adjusted in advance prior to a certain road topography occurring further improving the fuel efficiency of the vehicle.

Optionally in some examples, the method may further comprise determining a torque value based on the virtual total gear ratio, by the processing circuitry and causing control of the torque provided by the motor based on the torque value.

Optionally in some examples, the method may further comprise determining an output torque for the motor based on the torque value.

Optionally in some examples, the method may further comprise determining an output torque max value for the motor based on the torque value, by the processing circuitry. A technical benefit may include that a max torque level may be set for the motor, thereby limiting the motor torque to a suitable level for keeping the drivability to an acceptable level while improving fuel efficiency.

Optionally in some examples, the method may further comprise obtaining motor torque demand data associated with a torque demand for the motor and/or a current pedal demand, by the processing circuitry and determining the torque value based on the motor torque demand data. A technical benefit may include that the virtual total gear ratio is adapted based on the present or predicted demand of torque provided by the motor increasing the responsiveness of the torque management strategy.

Optionally in some examples, the method may further comprise determining the torque value for an operational state of the vehicle. A technical benefit may include that the responsiveness of the torque management strategy is improved due to the torque being controlled in accordance with a present or predicted operational state.

Optionally in some examples, the operational state of the vehicle may be any one of a drive mode, a cruise control mode, a pedal driving mode, an automatic gearbox mode, a manual gearbox mode and a kickdown mode.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

FIG. 4 is an exemplary mapping of reference virtual total gear ratios according to an example.

FIG. 5 is a flow chart of an exemplary implementation of a method for controlling a motor according to an example.

FIG. 6 is a flow chart of an exemplary implementation of a method for controlling a motor according to an example.

DETAILED DESCRIPTION

The detailed description set forth below provides information and examples of the disclosed technology with sufficient detail to enable those skilled in the art to practice the disclosure.

The torque provided by a motor of a vehicle, the gear ratio of the powertrain system and the motor speed are intrinsically related. The correlation between motor torque, gear ratio and motor speed is complex and depends on many factors such as the size and type of motor, the vehicle's weight, the transmission and differential ratios, and the desired performance characteristics of the vehicle. However, understanding these factors can help in optimizing a vehicle's performance for different driving conditions.

A higher gear ratio means that the driving gear has more teeth than the driven gear, resulting in the wheels turning faster but with less torque. A lower gear ratio means that the driving gear has fewer teeth than the driven gear, resulting in the wheels turning slower but with more torque.

When a vehicle is in motion, the motor torque is transmitted to the wheels through the transmission and drivetrain. The gear ratio of the transmission and differential affects the final output torque at the wheels, and the motor speed determines how fast the wheels will turn. At low engine speeds, the engine may not produce sufficient torque to move the vehicle, so a lower gear ratio is used to increase the force applied to the wheels. As the engine speed increases, the engine produces more torque, and a higher gear ratio can be used to convert this torque into an increased wheel speed.

The powertrain system sets constraints for the gear ratio. Although the gear ratio of the powertrain system may be altered by means of gear shifting or freewheeling etc., only a set number of gear ratios for the entire powertrain system is obtainable.

Particularly in the field of heavy-duty vehicles, the weight of the vehicle and consequently the load which the motor should propel, may vary greatly. Due to the load varying, there are often situations where the torque demand on the motor is greater than the actual torque required to maintain a constant speed with acceptable drivability. This results in a higher fuel consumption than needed and in turn negatively impact both cost and environment.

The examples of the disclosure herein may serve to address the above issues and/or may bring other potential improvements or advantages relative to conventional motor control strategies.

Figure 1:
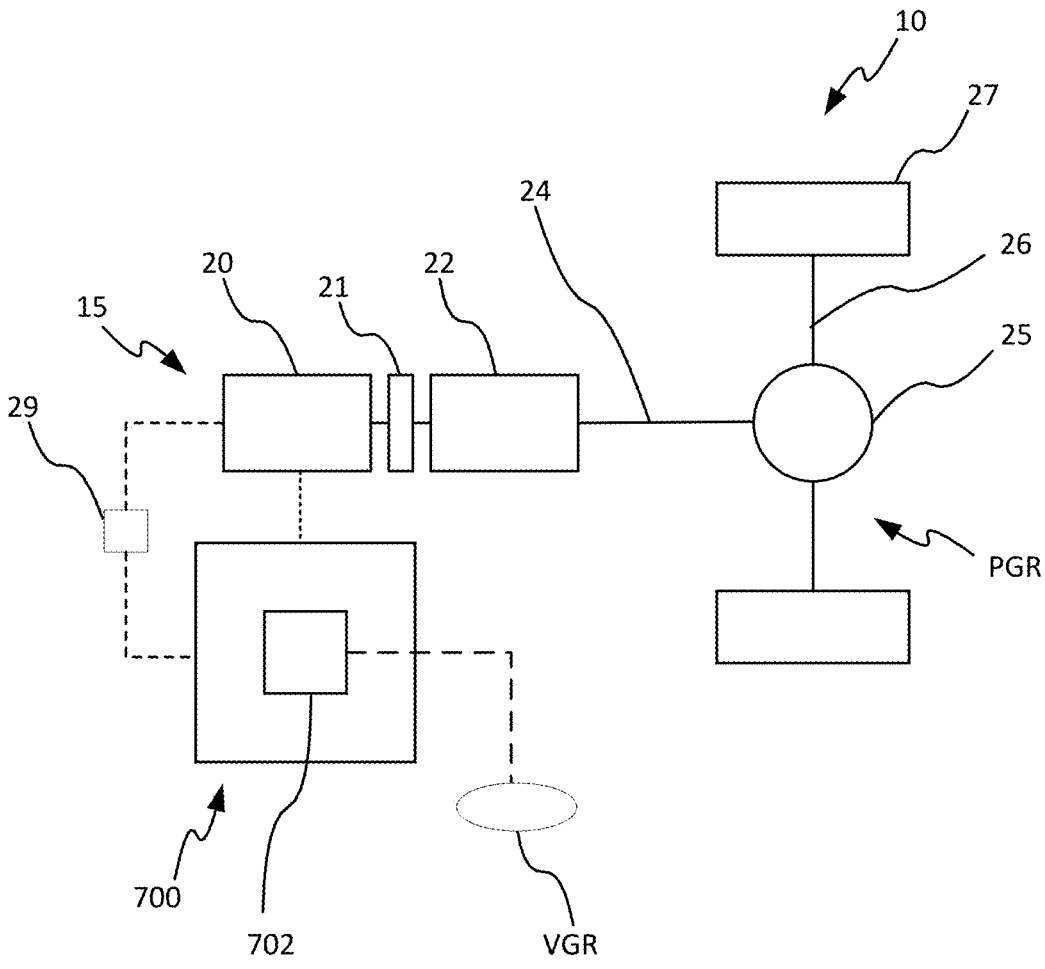
FIG. 1 is an exemplary system diagram of a computer system and a vehicle according to an example.

FIG. 1 is an exemplary vehicle 10 and a computer system 700 according to an example.

The vehicle 10 may comprise a powertrain system 15. The powertrain system 15 may be configured to propel the vehicle 10. The powertrain system 15 may comprise a motor 20. The motor 20 may be able to drive the drive wheels 27 of the vehicle 10 through the powertrain system 15. The motor 20 may be considered a traction motor. In many cases, such as in a conventional truck as represented on FIG. 1, the motor 20 may be a combustion engine. In addition, the powertrain system 15 may include a clutch 21, a gearbox 22, a propeller shaft 24, a differential 25 and/or a drive shaft 26 for each drive wheel 27.

It is possible to define a downstream portion of the powertrain system 15 as being the portion of the powertrain system 15 which connects the motor 20 to the drive wheels 27. The gear ratio of the downstream portion is changed depending on the gear of the gearbox 22 or if the clutch 21 is opened, thereby disconnecting the gearbox 22 from the motor 21, and/or if the gearbox 22 is in neutral. The downstream portion may thus comprise the propulsion shaft 24, the differential 25 and the drive shafts 26. In the case of a purely electrical vehicle, where the motor 20 is an electrical motor, a similar drivetrain can be used, possibly without the clutch 21. In a parallel hybrid truck, an electric motor can be added to the drivetrain of a conventional truck, for example upstream of the gearbox 22, although such an electrical motor could also be connected downstream of the gearbox 22. A series hybrid vehicle can be considered as a variant of an electrical vehicle where at least part of the electrical power needed by the motor is provided by an electrical generator driven by a combustion engine.

Further referencing FIG. 1, a computer system 700 for controlling the torque provided by the motor 20 of the powertrain system 15 of the vehicle 10 may be provided. The powertrain system 15 is configured to provide a physical total gear ratio PGR. The computer system 700 may comprise processing circuitry 702.

The processing circuitry 702 may be configured to determine a virtual total gear ratio VGR for the powertrain system 15. The processing circuitry 702 may be configured to determine said virtual total gear ratio VGR based on one or more operational parameters of the vehicle 10.

The virtual total gear ratio VGR may thus be either greater or smaller than the physical total gear ratio PRG. Preferably, the virtual total gear ratio VGR may be determined for an operational state of the vehicle 10. The virtual total gear ratio VGR for said operational state may thus be distinguished from the physical total gear ratio PGR for the same operational state of the vehicle 10. Accordingly, the virtual total gear ratio may be determined for a specific operational state of the vehicle 10.

The virtual total gear ratio VGR may be distinguished from the physical total gear ratio PGR.

The physical total gear ratio PGR provided by the powertrain system 15 may depend on the operational state of the vehicle 10 and/or powertrain system 15.

Total gear ratio herein refers to the gear ratio of the entire powertrain system 15 downstream of the motor 20, e.g. the aforementioned downstream portion of the powertrain system 15. Conventionally, the portion of the powertrain system disposed downstream of the motor is considered the drivetrain. Hence, the total gear ratio may be considered a drivetrain gear ratio. The virtual total gear ratio and the physical total gear ratio may accordingly be considered a virtual drivetrain gear ratio and a physical drivetrain gear ratio, respectively.

The total gear ratio may vary depending on the current gear of the gearbox 22, if the clutch 21 is opened or closed etc. The total gear ratio may thus be a total gear ratio associated with an operational state of the vehicle 10. The operational state of the vehicle 10 may be a present operational state or a predicted operational state of the vehicle 10.

The physical total gear ratio PGR may herein refer to the physical gear ratio of the entire portion of the powertrain system 15 disposed downstream of the motor 20. In the depicted example, this includes the gear ratio of the clutch 21, the gearbox 22, the propeller shaft 24, the differential 25 and the drive shafts 26. It may however be envisioned that with another design of the powertrain system 15, the components forming the total gear ratio may be different.

Accordingly, the physical total gear ratio PGR may herein refer to the ratio of the number of teeth of the meshing gears in the powertrain system 15 downstream from the motor 20. The physical total gear ratio PGR determines how much torque and speed is transferred from the motor 20 to the drive wheels 27. A higher physical total gear ratio PGR means more torque but lower speed, while a lower physical total gear ratio PGR means higher speed but less torque. Gear ratio is an important factor in determining the performance and efficiency of a powertrain system 15.

Virtual total gear ratio VGR may herein refer to a value determined by the processing circuitry 702. Thus, the virtual total gear ratio may correspond to a simulated total gear ratio. The virtual total gear ratio may thus be determined as a gear ratio for the entire portion of the powertrain system 15 disposed downstream of the motor 20.

The computer system 700 may be operatively connected to the powertrain system 15. The computer system 700 may be operatively connected to the motor 20 for controlling said motor 20.

The processing circuitry 702 may be configured to cause control of the torque provided by the motor 20 based on the virtual total gear ratio VGR. Accordingly, the motor 20 may be controlled based on a simulated gear ratio. The simulated gear ratio is in turn determined based on operational parameters of the vehicle. Thereby, the motor 20 may be controlled based on predicted or present conditions in order to operate more energy efficiently. Accordingly, the processing circuitry 702 may be configured to cause control the torque provided by the motor 20 based on the virtual gear ratio VGR by causing control of said motor 20. The torque is thus adapted directly by means of the processing circuitry 702 causing control of the motor 20. The control of said torque may be independent from any control of the physical total gear ratio PGR by means of shifting etc.

The torque provided by the motor 20 may be controlled by means of a motor controller 29. The motor controller 29 may be operatively connected to the motor 20 and configured to control the motor 20. Alternatively, or additionally, in some examples, the computer system 700 may be operatively connected to said motor controller 29. Alternatively, or additionally, in some examples, the computer system 700 may comprise the motor controller 29. Alternatively, or additionally, in some examples, the processing circuitry 702 may comprise the motor controller 29 (or vice versa).

Depending on the type of motor, the torque provided by the motor 20 may be controlled by the motor controller 29 in different manners.

In the case of the motor 20 being a combustion engine, e.g. an internal combustion engine, the torque provided by the motor 20 may be controlled by for example adjusting the amount of fuel injected into the motor 20, the amount of air allowed into the cylinders, valve timing and/or ignition timing.

In the case of the motor 20 being an electrical motor, the torque provided by the motor 20 may be controlled by for example adjusting the voltage applied to the motor 20, the current flowing through the motor 20, the strength of the magnetic field in the rotor of the motor 20 and/or the speed of the motor 20 by means of controlling the load on the motor 20 or the frequency of the applied voltage.

The one or more operational parameters of the vehicle 10 may comprise at least one of vehicle speed data, vehicle acceleration data, vehicle weight data, road inclination data, the physical total gear ratio PGR and topography data.

The vehicle speed data may be associated with a predicted speed of the vehicle 10, for example for the road ahead of the vehicle 10, a planned route of the vehicle 10, and/or a current speed of the vehicle 10. The current speed of the vehicle 10 may be a calculated speed of the vehicle 10 or a measured speed of the vehicle 10 obtained by a speed sensor operatively connected to the computer system 700.

The vehicle acceleration data may be associated with a predicted acceleration of the vehicle 10, for example for the road ahead of the vehicle 10, a planned route of the vehicle 10, and/or a current acceleration of the vehicle 10. The current acceleration of the vehicle 10 may be a calculated acceleration of the vehicle 10 or a measured acceleration of the vehicle 10 obtained by an acceleration sensor operatively connected to the computer system 700.

The vehicle weight data may be associated with a total current weight of the vehicle 10. The total current weight of the vehicle 10 may include the weight of any cargo to be transported by the vehicle 10. The total current weight of the vehicle 10 greatly impacts the torque required to be provided by the motor 20. For example, in the case of the vehicle 10 not carrying any cargo, a comparatively lower torque provided by the motor 20 is required by the motor 20 for maintaining the same speed compared to the same vehicle 10 carrying heavy cargo.

The road inclination data and/or the topography data may be data relating to the road on which the vehicle 10 travels and in particular the road segment ahead of the vehicle 10 in the travelling direction of the vehicle 10. The data may thus be based on map data relating to the road on which the vehicle 10 travels. The data may comprise data from a Geographic Information System (GIS). The data may comprise data associated with the topography of the road ahead of the vehicle 10, the inclination of the road ahead of the vehicle 10 and/or the curvature of the road ahead of the vehicle 10.

The road inclination data and/or the topography data may comprise data relating to a planned route of the vehicle 10. The data relating to a planned route of the vehicle 10 may comprise positional data such as data from a Geographic Information System (GIS). The data may comprise data associated with the topography of the planned route of the vehicle 10, the inclination of the planned route of the vehicle 10 and/or the curvature of the planned route of the vehicle 10. The data may further include data indicating the predicted speeds and/or gear shifts during the travelling on the planned route of the vehicle 10.

Thus, the virtual total gear ratio VGR may be determined for an upcoming road segment ahead of the vehicle 10 and based on topography data and/or road inclination data for the upcoming road segment.

Optionally in some examples, the virtual total gear ratio VGR may be determined for an operational state of the vehicle 10. The virtual total gear ratio VGR may be associated with said operational state of the vehicle 10.

Optionally in some examples, the physical total gear ratio PGR for the powertrain system 15 may be associated with the operational state of the vehicle 10.

Optionally in some examples, the virtual total gear ratio VGR for the operational state is distinguished from the physical total gear ratio PGR associated with the same operational state.

The operational state of the vehicle 10 may be any one of a drive mode, a cruise control mode, a pedal driving mode, an automatic gearbox mode, a manual gearbox mode and a kickdown mode.

The drive mode may be a drive mode of the vehicle 10. Drive mode may refer to different settings or configurations that can be selected to change the performance characteristics of a vehicle. Examples of drive modes may include Eco Mode which may optimize fuel efficiency by reducing engine power output, Performance Mode which may prioritize power by increasing motor power output, Comfort Mode which may prioritize ride comfort by for example adjusting transmission shift points, Off-Road Mode which may be specifically designed for off-road driving and may adjust suspension settings, throttle response, and transmission shift points to improve traction and stability and Normal Mode which may be the default setting for most vehicles and may provide a balanced driving experience suitable for driving in normal conditions.

The pedal driving mode may be a pedal driving mode of the vehicle 10. In the pedal driving mode, the motor 20 may be controlled based on input from a pedal such as an accelerator pedal of the vehicle.

The automatic gearbox mode may be an automatic gearbox mode of the vehicle 10. In the automatic gearbox mode, the gear of the gearbox may be shifted automatically by means of a gearbox controller.

The manual gearbox mode may be a manual gearbox mode of the vehicle 10. In the manual gearbox mode, the gear of the gearbox may be shifted by the driver for example by means of a gear stick.

The kickdown mode may be a kickdown mode of the vehicle 10. As the skilled person is aware, the kickdown mode is commonly found in vehicles with automatic transmissions. In the kickdown mode, the gear is shifted by means of the driver operating the accelerator pedal. In the kickdown mode, the gear may be shifted in response to the accelerator pedal being depressed to an end position.

Figure 2:
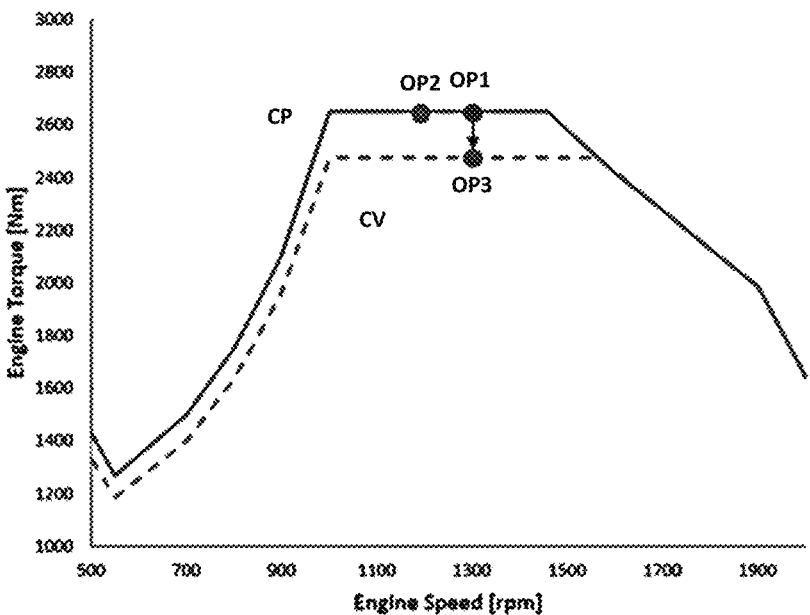
FIG. 2 is an exemplary graph of the motor torque according to an example.

FIG. 2 depicts an exemplary graph of the motor torque and the implementation of an exemplary control strategy described herein. In the depicted example, the motor 20 is in the form of a combustion engine.

The graph depicts two separate torque curves, CP and CV. The torque curves CP, CV are obtained by a number of operating points of the motor 20. Each operating point is associated with a motor speed, e.g. an engine speed, and an associated motor torque, e.g. an engine torque.

One of the torque curves is a physical torque curve CP. The physical torque curve CP represents the motor torque provided by the motor 20 at different motor speeds at set physical total gear ratios PGR.

The other torque curve is a virtual torque curve CV. The virtual torque curve CV represents the motor torque provided by the motor 20 at different motor speeds for a set virtual total gear ratio VGR.

The first operating point OP1 of the motor 20 considers a physical total gear ratio PGR. In the depicted example, the first operating point OP1 is an operating point with a physical total gear ratio PGR of 3.0, a motor torque of 2650 Nm and an engine speed of 1300 rpm corresponding to a motor power of 360 kW.

While the motor 20 operates at the first operating point OP1, power is demanded from the driver, for example via the accelerator pedal, for maintaining the vehicle 10 at a constant speed. In the depicted example, the power is higher than needed for keeping the drivability of the vehicle 10 at an acceptable level.

The second operating point OP2 corresponds to an operating point achieved at the same power demand as the first operating point OP1 but with a faster, i.e. higher, gear ratio. In the depicted example, the second operating point OP2 is an operating point with a physical total gear ratio PGR of 2.8, a motor torque of 2650 Nm and an engine speed of 1200 rpm corresponding to a motor power of 330 kW. However, physically changing the physical gear ratio to achieve the second operating point OP2 may not be possible in the vehicle 10 of the depicted example.

Instead of the second operating point OP2, a virtual total gear ratio VGR may be utilized to achieve the same power. The virtual total gear ratio VGR may be determined such that the same power is achieved thereby reducing the torque provided by the motor 20. Thereby a third operating point OP3 is achieved. In the third operating point OP3, the torque demand on the motor 20 is decreased such that it matches the power of the virtual total gear ratio VGR. In the depicted example, the third operating point OP3 is an operating point with a virtual total gear ratio VGR of 2.8, a motor torque of 2420 Nm and an engine speed of 1300 rpm corresponding to a motor power of 330 kW. Thus, virtually the same motor power is provided in the third operating point OP3 compared to the second operating point OP2 whereby the fuel consumption may be reduced.

Figure 3:
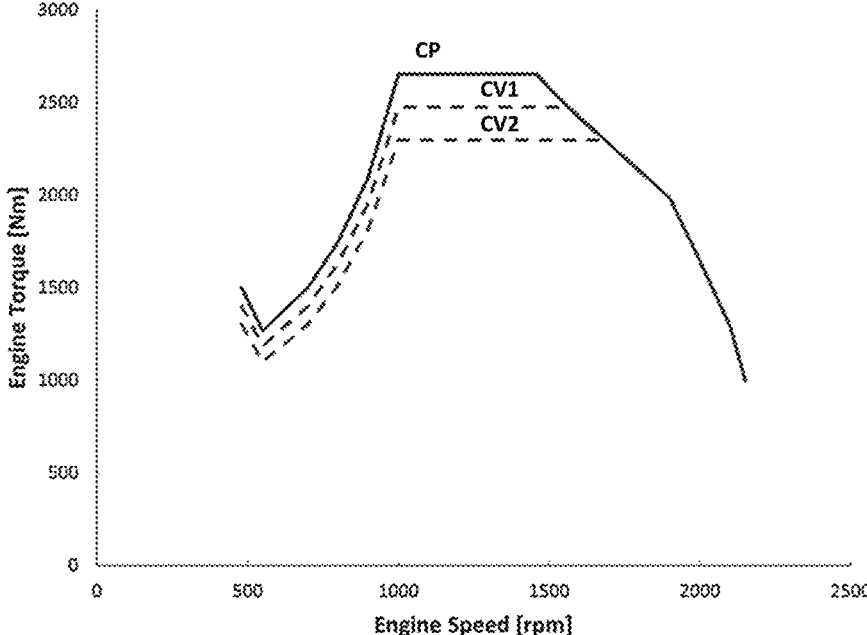
FIG. 3 is an exemplary graph of the motor torque according to an example.

FIG. 3 depicts a graph exemplifying the maximum torque available to be provided by the motor 20 considering a set physical total gear ratio PGR compared to the torque available to be provided by the motor 20 at set virtual total gear ratios VGR being lower than the set physical total gear ratio PGR.

In the depicted example, a physical torque curve CP considering the set physical total gear ratio PGR is presented. In the depicted example, the physical total gear ratio PGR for the physical torque curve CP is 3.0.

The graph further depicts a first virtual torque curve CV1 considering a set virtual total gear ratio VGR. In the depicted example, the virtual total gear ratio VGR is set to 2.8.

The graph also depicts a second virtual torque curve CV2 considering a set virtual total gear ratio VGR. In the depicted example, the virtual total gear ratio VGR is set to 2.6.

Depending on a calibration of the torque management strategy and how aggressively the torque is to be limited, a suitable virtual total gear ratio VGR may be selected.

FIG. 4 depicts an example of how the virtual total gear ratio VGR may be determined.

The virtual total gear ratio VGR may be determined based on the vehicle acceleration data and the vehicle speed data. Thus, the processing circuitry 702 may be configured to determine the virtual total gear ratio VGR based on the vehicle speed data and the vehicle acceleration data.

Advantageously, the virtual total gear ratio VGR may be determined by mapping of the vehicle speed data and the vehicle acceleration data to a reference virtual total gear ratio.

FIG. 4 depicts an example of such a process. For a given vehicle operating point of the vehicle 10, a vehicle acceleration and a vehicle speed is obtained. The vehicle speed and vehicle acceleration may be obtained by the processing circuitry 702. The vehicle operating point may be a predicted vehicle operating point or a current vehicle operating point. Thus, the vehicle speed may be a current vehicle speed or a predicted vehicle speed. Correspondingly, the vehicle acceleration may be a current vehicle acceleration or a predicted vehicle acceleration.

Based on the obtained vehicle speed and vehicle acceleration, a virtual total gear ratio VGR may be selected from a set of reference virtual total gear ratios. The reference virtual total gear ratios may be associated with corresponding vehicle operating points. The reference virtual total gear ratios may thus be associated with a corresponding vehicle acceleration and vehicle speed.

In the depicted example, the virtual total gear ratio VGR is selected in a look-up table of reference virtual total gear ratios based on the vehicle acceleration and the vehicle speed.

The reference virtual total gear ratios may be predetermined values. In one example, the reference virtual total gear ratios may be predetermined based on simulation and/or vehicle testing. The reference virtual total gear ratios may be predetermined based on a desired balance between fuel efficiency and vehicle drivability/performance. The values of the reference virtual total gear ratios may be selected such that a previously tested or simulated desirable balance between the fuel efficiency and drivability/performance for the vehicle speed and acceleration is achieved.

FIGS. 5-6 depicts the implementation of the virtual total gear ratio in the control of the motor 20 according to some examples.

The processing circuitry 702 may be configured to determine a torque value TV based on the virtual total gear ratio VGR. The processing circuitry 702 may be further configured to cause control of the torque provided by the motor 20 based on the torque value TV.

The processing circuitry 702 may be configured to determine an output torque OTV of the motor 20. The processing circuitry 702 may be configured to determine the output torque OTV based on the torque value TV. The output torque OTV may be considered the torque value provided by the motor 20.

The processing circuitry 702 may be configured to obtain motor torque demand data. The motor torque demand data may be associated with a torque demand for the motor 20 and/or a current pedal demand. The processing circuitry 702 may be further configured to determine the torque value TV based on the motor torque demand data.

The current pedal demand may be associated with input data obtained from the accelerator pedal of the vehicle 10. Thus, the current pedal demand may be based on the current position of the accelerator pedal of the vehicle 10.

The motor torque demand data may be associated with control data for controlling the operation of the motor 20. The motor torque demand data may be obtained from the motor controller 29. The motor controller 29 may accordingly be configured to control the operation of the motor 20 by means of the motor torque demand data.

The processing circuitry 702 may be configured to determine an output torque max value OTVmax for the motor 20. The output torque max value OTVmax may be determined based on the torque value TV. Thus, the processing circuitry 702 may be configured to set a limit to the torque provided by the motor 20 based on the determined torque value and the virtual total gear ratio VGR. Thus, the processing circuitry 702 may be configured to cause limiting of the output torque OTV up to the output torque max value OTVmax. Hence, the processing circuitry 702 may be configured to set an upper torque limit for the torque provided by the motor 20 in the form of the output torque max value OTVmax based on the operational parameters.

As will be described with reference to FIG. 5 and FIG. 6 this may be performed regardless of the current operating point of the motor 20 or only at certain operating points of the motor 20.

Referencing FIG. 5, an example of a torque limiter implementation is depicted. The processing circuitry 702 may obtain a predetermined output torque threshold level OTmax. The processing circuitry 702 may be configured to cause control of torque provided by the motor 20 in response to the motor torque demand data indicating that a torque level higher than the predetermined output torque threshold level OTmax is demanded. A demanded torque level TD may accordingly be obtained from the motor torque demand data.

In response to the demanded torque level TD being lower than the predetermined output torque threshold level OTmax, the output torque value OTV may be set to the demanded torque level TD. Accordingly, the motor 20 will not be controlled based on a determined virtual total gear ratio VGR.

In response to the demanded torque level TD exceeding the predetermined output torque threshold level OTmax, the output torque value OTV may be determined based on the virtual total gear ratio VGR. In the depicted example, the virtual total gear ratio VGR is determined based on the vehicle speed VS and the vehicle acceleration VA. In the depicted example, the output torque value OTV is determined as an output torque max value OTVmax.

Further referencing FIG. 5, the implementation may further include a feedback loop. Thus, a current output torque TC may be obtained. The processing circuitry 702 may be configured to obtain the current output torque TC and compare the current output torque TC and the demanded torque level TD. The processing circuitry 702 may be configured to cause control of the motor 20 based on said comparison.

The processing circuitry 702 may be configured to determine a final output current torque OTVC after the output torque value OTV has been determined. The processing circuitry 702 may be configured to compare the output torque value OTV and the final current torque OTVC and cause control of the motor 20 based on said comparison. Thereby, a feedback loop is provided in order for the motor to reach the desired output torque.

Referencing FIG. 6, an example of a torque demander implementation is depicted. In the torque demander implementation, the virtual total gear ratio VGR may be utilized for every operating point of the motor 20. This may be preferable over the torque limiter implementation depicted in FIG. 5 as all engine output torque may be scaled in accordance with the selected virtual total gear ratio VGR.

As depicted, the processing circuitry 702 may be configured to obtain the demanded torque level TD from the motor torque demand data.

The output torque value OTV may be determined based on the virtual total gear ratio VGR. In the depicted example, the virtual total gear ratio VGR is determined based on the vehicle speed VS and the vehicle acceleration VA. In the depicted example, the output torque value OTV is determined as an output torque max value OTVmax.

Further referencing FIG. 6, the implementation may further include a feedback loop. Thus, a current output torque TC may be obtained. The processing circuitry 702 may be configured to obtain the current output torque TC and compare the current output torque TC and the demanded torque level TD. The processing circuitry 702 may be configured to cause control of the motor 20 based on said comparison.

The processing circuitry 702 may be configured to determine a final output current torque OTVC after the output torque value OTV has been determined. The processing circuitry 702 may be configured to compare the output torque value OTV and the final current torque OTVC and cause control of the motor based on said comparison. Thereby, a feedback loop is provided in order for the motor to reach the desired output torque.

Figure 7:
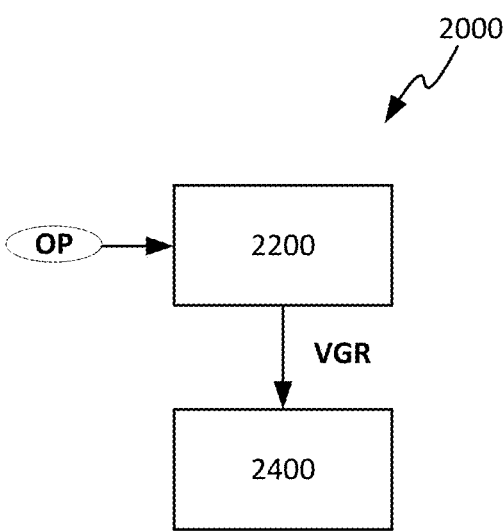
FIG. 7 is an exemplary flow chart of a method for controlling a motor according to an example.

An exemplary method 2000 for controlling the torque provided by the motor 20 is shown in FIG. 7.

The method 2000 is suitable for implementation in a vehicle 10 for controlling the torque provided by the motor 20 as previously presented. The method 2000 will be briefly described, but it should be emphasized that the method 2000 may very well be extended to further comprise any suitable features or examples presented herein. Execution of the method 2000 is advantageously caused or performed by the processing circuitry 702 of the computer system 700 presented herein. However, execution of the method 2000 may be performed or caused by any suitable processing circuitry or collection/distribution of processing circuitry and is not limited to execution by the processing circuitry 702 of the computer system 700.

The method 2000 may be a computer-implemented method for controlling the torque provided by the motor 20 of the powertrain system 15 of the vehicle 10.

The method 2000 may comprise determining 2200 the virtual total gear ratio VGR for the powertrain system 15 based on the one or more operational parameters OP of the vehicle 10. The virtual total gear ratio VGR may be determined by the processing circuitry 702 of the computer system 700.

The method 2000 may comprise causing 2400 control of the torque provided by the motor 20 based on the virtual total gear ratio VGR. The control of the torque provided by the motor 20 may be caused by the processing circuitry 702.

Figure 8:
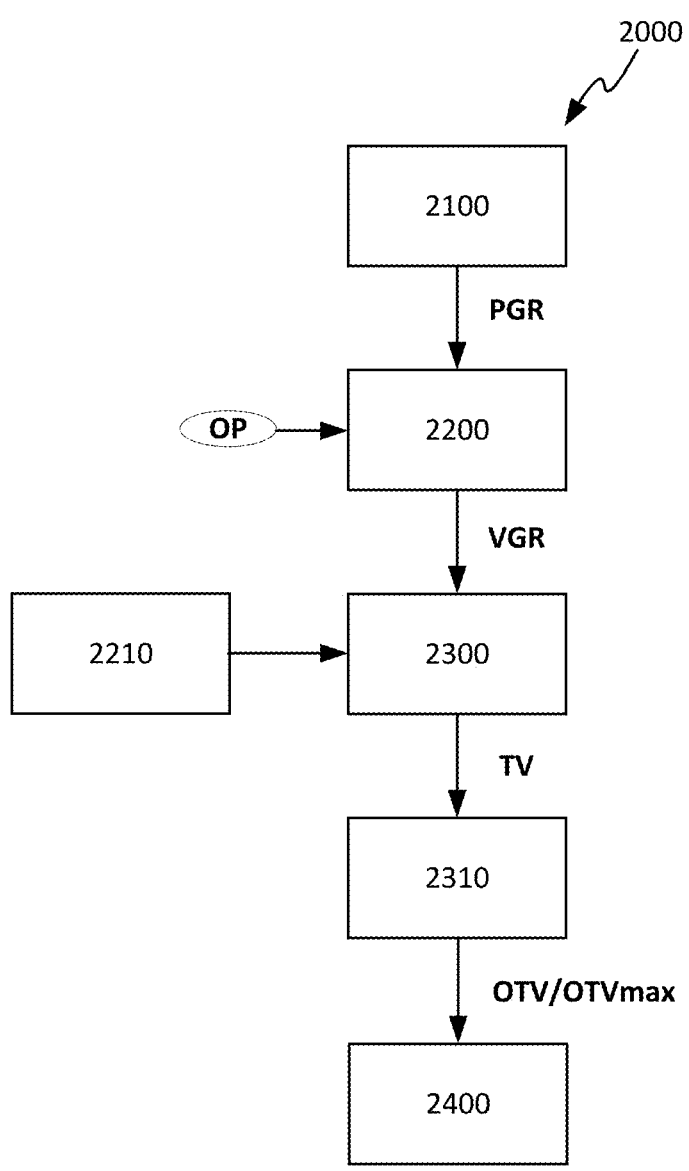
FIG. 8 is an exemplary flowchart of a method for controlling a motor according an example.

FIG. 8 is a flow chart of a method 2000 according to an example.

The method 2000 may comprise obtaining 2100 the physical total gear ratio PGR for the powertrain system 15. The physical total gear ratio PGR may be obtained by the processing circuitry 702. As aforementioned, the physical total gear ratio PGR may be associated with an operational state of the vehicle 10.

The method 2000 may comprise obtaining operational parameter data associated with the one or more operational parameter OP.

The virtual total gear ratio VGP may be determined based on the one or more operational parameter OP.

As aforementioned, vehicle speed data and vehicle acceleration data may form a part of the one or more operational parameters, e.g. the operational parameter data. Accordingly, the method 2000 may comprise determining the virtual total gear ratio VGR based on the vehicle speed data and the vehicle acceleration data. The virtual total gear ratio VGR may be determined by mapping of the vehicle speed data and the vehicle acceleration data to a reference virtual total gear ratio.

Additionally or alternatively, topography data and/or road inclination data may form a part of the one or more operational parameters, e.g. the operational parameter data. Accordingly, the method 2000 may comprise determining the virtual total gear ratio VGR for an upcoming road segment ahead of the vehicle 10 based on the topography and/or road inclination data for said upcoming road segment.

As depicted in FIG. 8, the method 2000 may comprise determining 2300 the torque value TV. The torque value TV may be determined based on the virtual total gear ratio VGR, The torque value TV may be determined by the processing circuitry 702. Further, the control of the torque provided by the motor 20 may be caused based on the torque value TV. The processing circuitry 702 may cause control of the torque provided by the motor based on said torque value TV.

The torque value TV may be determined based on the torque demand for the motor 20 and/or a current pedal demand. The method 2000 may comprise obtaining 2210 the motor torque demand data associated with the torque demand for the motor 20 and/or the current pedal demand. The processing circuitry 702 may obtain the motor torque demand data.

The output torque value OTV for the motor 20 may be determined 2310 based on the torque value TV. The output torque value OTV may be determined by the processing circuitry 702.

The method 2000 may further comprise determining 2310 an output torque max value OTVmax for the motor 20 based on the torque value TV. The output torque max value OTVmax may be determined by the processing circuitry 702.

The torque value TV may be determined for an operational state of the vehicle 10. The physical total gear ratio PGR for the powertrain system 15 may be associated with the operational state of the vehicle 10.

Figure 9:
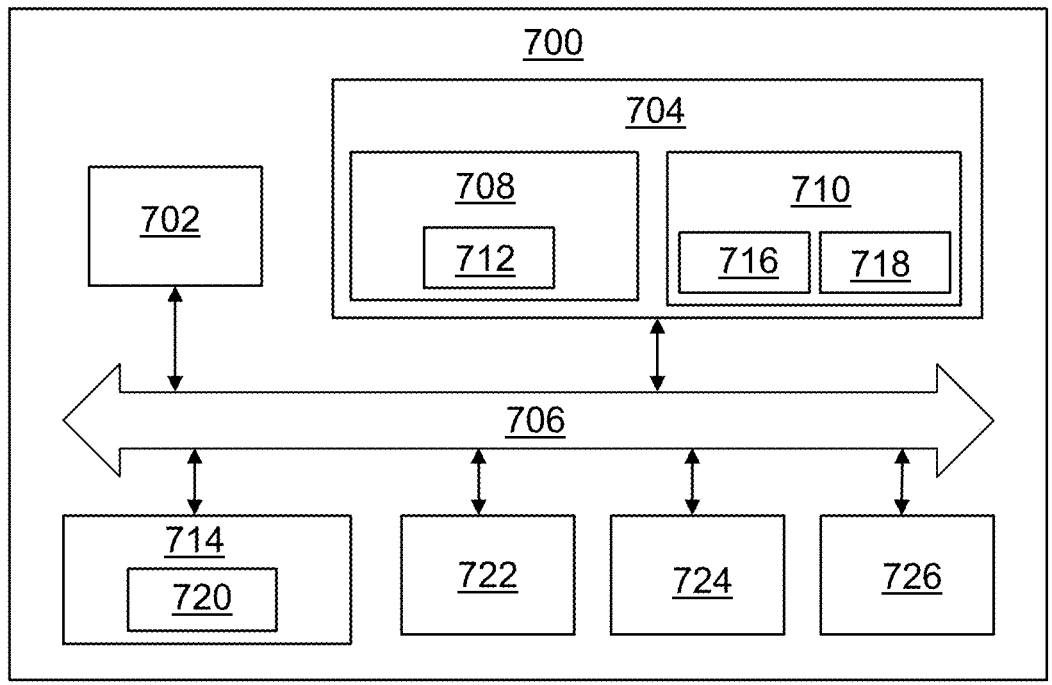
FIG. 9 is a schematic diagram of an exemplary computer system for implementing examples disclosed herein, according to an example.

FIG. 9 is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include processing circuitry 702 (e.g., processing circuitry including one or more processor devices or control units), a memory 704, and a system bus 706. The computer system 700 may include at least one computing device having the processing circuitry 702. The system bus 706 provides an interface for system components including, but not limited to, the memory 704 and the processing circuitry 702. The processing circuitry 702 may include any number of hardware components for conducting data or signal processing or for executing computer code stored in memory 704. The processing circuitry 702 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 702 may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processing circuitry 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with processing circuitry 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program 720 stored on a transitory or non-transitory computer-usable or computer-readable storage medium (e.g., single medium or multiple media), such as the storage device 714, which includes complex programming instructions (e.g., complex computer-readable program code) to cause the processing circuitry 702 to carry out actions described herein. Thus, the computer-readable program code of the computer program 720 can comprise software instructions for implementing the functionality of the examples described herein when executed by the processing circuitry 702. In some examples, the storage device 714 may be a computer program product (e.g., readable storage medium) storing the computer program 720 thereon, where at least a portion of a computer program 720 may be loadable (e.g., into a processor) for implementing the functionality of the examples described herein when executed by the processing circuitry 702. The processing circuitry 702 may serve as a controller or control system for the computer system 700 that is to implement the functionality described herein.

The computer system 700 may include an input device interface 722 configured to receive input and selections to be communicated to the computer system 700 when executing instructions, such as from a keyboard, mouse, touch-sensitive surface, etc. Such input devices may be connected to the processing circuitry 702 through the input device interface 722 coupled to the system bus 706 but can be connected through other interfaces, such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may include a communications interface 726 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1

A computer system 700 comprising processing circuitry 702 for controlling a torque provided by a motor 20 of a powertrain system 15 of a vehicle 10, the powertrain system 15 being configured to provide a physical total gear ratio PGR, wherein the processing circuitry 702 is configured to:
  determine a virtual total gear ratio VGR for the powertrain system 15 based on one or more operational parameters OP of the vehicle 10, and
  cause control of the torque provided by the motor 20 based on the virtual total gear ratio VGR.

Example 2

The computer system 700 of example 1, wherein the one or more operational parameters of the vehicle 10 comprises at least one of vehicle speed data, vehicle acceleration data, vehicle weight data, road inclination data, the physical total gear ratio PGR and topography data.

Example 3

The computer system 700 of example 2, wherein the virtual total gear ratio VGR is determined based on the vehicle acceleration data and the vehicle speed data.

Example 4

The computer system 700 of example 3, wherein the virtual total gear ratio VGR is determined by mapping of the vehicle speed data and the vehicle acceleration data to a reference virtual total gear ratio.

Example 5

The computer system 700 of any of example 2-4, wherein the virtual total gear ratio VGR is determined for an upcoming road segment ahead of the vehicle 10 and based on topography data, the physical total gear ratio PGR and/or road inclination data for said upcoming road segment.

Example 6

The computer system 700 of any of example 1-5, wherein the processing circuitry 702 is further configured to:

determine a torque value TV based on the virtual total gear ratio VGR, and cause control of the torque provided by the motor 20 based on the torque value TV.

Example 7

The computer system 700 of example 6, wherein the processing circuitry 702 is further configured to:

determine an output torque OTV of the motor 20 based on the torque value TV.

Example 8

The computer system 700 of example 7, wherein the processing circuitry 702 is further configured to:

determine an output torque max value OTVmax for the motor 20 based on the torque value TV.

Example 9

The computer system 700 of any of example 6-8, wherein the processing circuitry 702 is further configured to:

obtain motor torque demand data associated with a torque demand for the motor 20 and/or a current pedal demand, and determine the torque value TV based on said motor torque demand data.

Example 10

The computer system 700 of any of example 1-9, wherein the virtual total gear ratio VGR is determined for an operational state of the vehicle 10.

Example 11

The computer system 700 of example 10, wherein the physical total gear ratio PGR for the powertrain system 15 is associated with the operational state of the vehicle 10.

Example 12

The computer system 700 of any of example 10-11, wherein the operational state of the vehicle 10 is any one of: a drive mode, a cruise control mode, a pedal driving mode, an automatic gearbox mode, a manual gearbox mode and a kickdown mode.

Example 13

The computer system 700 of any of example 1-12, wherein the virtual total gear ratio VGR is distinguished from the physical total gear ratio PGR.

Example 14

The computer system 700 of any of example 1-13, wherein the processing circuity 702 is further configured to:

determine the virtual total gear ratio VGR independently of the physical total gear ratio PGR.

Example 15

The computer system 700 of any of example 1-13, wherein the processing circuitry 702 is further configured to:

determine the virtual total gear ratio VGR based on the physical total gear ratio PGR and at least one other operational parameter OP.

Example 16

A vehicle 10 comprising the computer system 700 of any of example 1-15.

Example 17

The vehicle 10 of example 16 further comprising a powertrain system 15.

Example 18

A computer-implemented method 2000 for controlling the torque provided by a motor 20 of a powertrain system 15 of a vehicle 10, the powertrain system 15 being configured to provide a physical total gear ratio PGR, the method 2000 comprising:

determining 2200, by a processing circuitry 702 of a computer system 700, a virtual total gear ratio VGR for the powertrain system 15 based on one or more operational parameters OP of the vehicle 10, and causing 2400 control of the torque provided by the motor 20 based on the virtual total gear ratio VGR, by the processing circuitry 702.

Example 19

The method 2000 of example 18, wherein the one or more operational parameters OP of the vehicle 10 comprises at least one of vehicle speed data, vehicle acceleration data, vehicle weight data, road inclination data, the physical total gear ratio PGR and topography data.

Example 20

The method 2000 of example 19, further comprising:

determining 2200 the virtual total gear ratio VGR based on the vehicle acceleration data and the vehicle speed data.

Example 21

The method 2000 of example 20, further comprising:

determining 2200 the virtual total gear ratio VGR by mapping of the vehicle speed data and the vehicle acceleration data to a reference virtual total gear ratio.

Example 22

The method 2000 of any of example 18-21, further comprising:

determining 2200 the virtual total gear ratio VGR for an upcoming road segment ahead of the vehicle 10 based on topography and/or road inclination data for said upcoming road segment.

Example 23

The method 2000 of any of Example 18-22, further comprising:

determining 2300 a torque value TV based on the virtual total gear ratio VGR, by the processing circuitry 702 and causing control of the torque provided by the motor 20 based on the torque value TV.

Example 24

The method 2000 of example 23, further comprising:
determining 2310 an output torque OTV for the motor 20 based on the torque value TV, by the processing circuitry 702.

Example 25

The method 2000 of example 24, further comprising:
determining 2310 an output torque max value OTVmax for the motor 20 based on the torque value TV, by the processing circuitry 702.

Example 26

The method 2000 of any of example 23-25, further comprising:
obtaining 2210 motor torque demand data associated with a torque demand for the motor 20 and/or a current pedal demand, by the processing circuitry 702 and
determining 2300 the torque value TV based on said motor torque demand data.

Example 27

The method 2000 of any of example 23-26, further comprising:
determining 2300 the torque value TV for an operational state of the vehicle 10.

Example 28

The method 2000 of any of example 18-27, wherein the physical gear total gear ratio PGR for the powertrain system 15 is associated with the operational state of the vehicle 10.

Example 29

The method 2000 of any of example 27-28, wherein the operational state of the vehicle 10 is any one of: a drive mode, a cruise control mode, a pedal driving mode, an automatic gearbox mode, a manual gearbox mode and a kickdown mode.

Example 30

The method 2000 of any of example 18-29, wherein the virtual total gear ratio VGR is distinguished from the physical total gear ratio PGR.

Example 31

The method 2000 of any of example 18-30, further comprising:
determining the virtual total gear ratio VGR independently of the physical total gear ratio PGR.

Example 32

The method 2000 of any of example 18-30, further comprising:

determining the virtual total gear ratio VGR based on the physical total gear ratio PGR and at least one other operational parameter OP.

Example 33

A computer program product comprising program code for performing, when executed by a processing circuitry 702, the method of any of examples 18-32.

Example 34

A non-transitory computer-readable storage medium comprising instructions, which when executed by a processing circuitry 702, cause the processing circuitry 702 to perform the method of any of examples 18-33.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry for controlling a torque provided by a motor of a powertrain system of a vehicle, the powertrain system being configured to provide a physical total gear ratio, wherein the processing circuitry is configured to:
    determine a virtual total gear ratio for the powertrain system based on one or more operational parameters of the vehicle, the virtual total gear ratio corresponding to a simulated total gear ratio,
    cause control of the torque provided by the motor based on the virtual total gear ratio, and
    determine the virtual total gear ratio independently of the physical total gear ratio.

2. The computer system of claim 1, wherein the one or more operational parameters of the vehicle comprises at least one of vehicle speed data, vehicle acceleration data, vehicle weight data, road inclination data, the physical total gear ratio and topography data.

3. The computer system of claim 2, wherein the virtual total gear ratio is determined based on the vehicle acceleration data and the vehicle speed data.

4. The computer system of claim 3, wherein the virtual total gear ratio is determined by mapping of the vehicle speed data and the vehicle acceleration data to a reference virtual total gear ratio.

5. The computer system of claim 2, wherein the virtual total gear ratio is determined for an upcoming road segment ahead of the vehicle and based on topography data and/or road inclination data for said upcoming road segment.

6. The computer system of claim 1, wherein the processing circuitry is further configured to:
    determine a torque value based on the virtual total gear ratio, and
    cause control of the torque provided by the motor based on the torque value.

7. The computer system of claim 6, wherein the processing circuitry is further configured to:
    determine an output torque of the motor based on the torque value.

8. The computer system of claim 7, wherein the processing circuitry is further configured to:
    determine an output torque max value for the motor based on the torque value.

9. The computer system of claim 6, wherein the processing circuitry is further configured to:
    obtain motor torque demand data associated with a torque demand for the motor and/or a current pedal demand, and
    determine the torque value based on said motor torque demand data.

10. The computer system of claim 1, wherein the virtual total gear ratio is determined for an operational state of the vehicle.

11. The computer system of claim 10, wherein the operational state of the vehicle is any one of: a drive mode, a cruise control mode, a pedal driving mode, an automatic gearbox mode, a manual gearbox mode and a kickdown mode.

12. A vehicle, comprising:
    a computer system, the computer system comprising:
    processing circuitry for controlling a torque provided by a motor of a powertrain system of the vehicle, the powertrain system being configured to provide a physical total gear ratio, wherein the processing circuitry is configured to:
    determine a virtual total gear ratio for the powertrain system based on one or more operational parameters of the vehicle, the virtual total gear ratio corresponding to a simulated total gear ratio,
    cause control of the torque provided by the motor based on the virtual total gear ratio, and
    determine the virtual total gear ratio independently of the physical total gear ratio.

13. A computer-implemented method for controlling a torque provided by a motor of a powertrain system of a vehicle, the powertrain system being configured to provide a physical total gear ratio, the method comprising:
    determining, by a processing circuitry of a computer system, a virtual total gear ratio for the powertrain system based on one or more operational parameters of the vehicle, the virtual total gear ratio corresponding to a simulated total gear ratio,
    causing control of the torque provided by the motor based on the virtual total gear ratio, by the processing circuitry, and
    determining, by the processing circuitry, the virtual total gear ratio independently of the physical total gear ratio.

14. The method of claim 13, wherein the one or more operational parameters of the vehicle comprises at least one of vehicle speed data, vehicle acceleration data, vehicle weight data, road inclination data, the physical total gear ratio and topography data.

15. The method of claim 14, further comprising:
    determining the virtual total gear ratio based on the vehicle acceleration data and the vehicle speed data.

16. The method of claim 15, further comprising:
    determining the virtual total gear ratio by mapping of the vehicle speed data and the vehicle acceleration data to a reference virtual total gear ratio.

17. The method of claim 13, further comprising:
    determining a torque value based on the virtual total gear ratio, by the processing circuitry, and
    causing control of the torque provided by the motor based on the torque value.

18. The method of claim 17, further comprising:
    determining an output torque for the motor based on the torque value, by the processing circuitry.

19. The method of claim 18, further comprising:
    determining an output torque max value for the motor based on the torque value, by the processing circuitry.

* * * * *